United States Patent Office 3,271,113
Patented Sept. 6, 1966

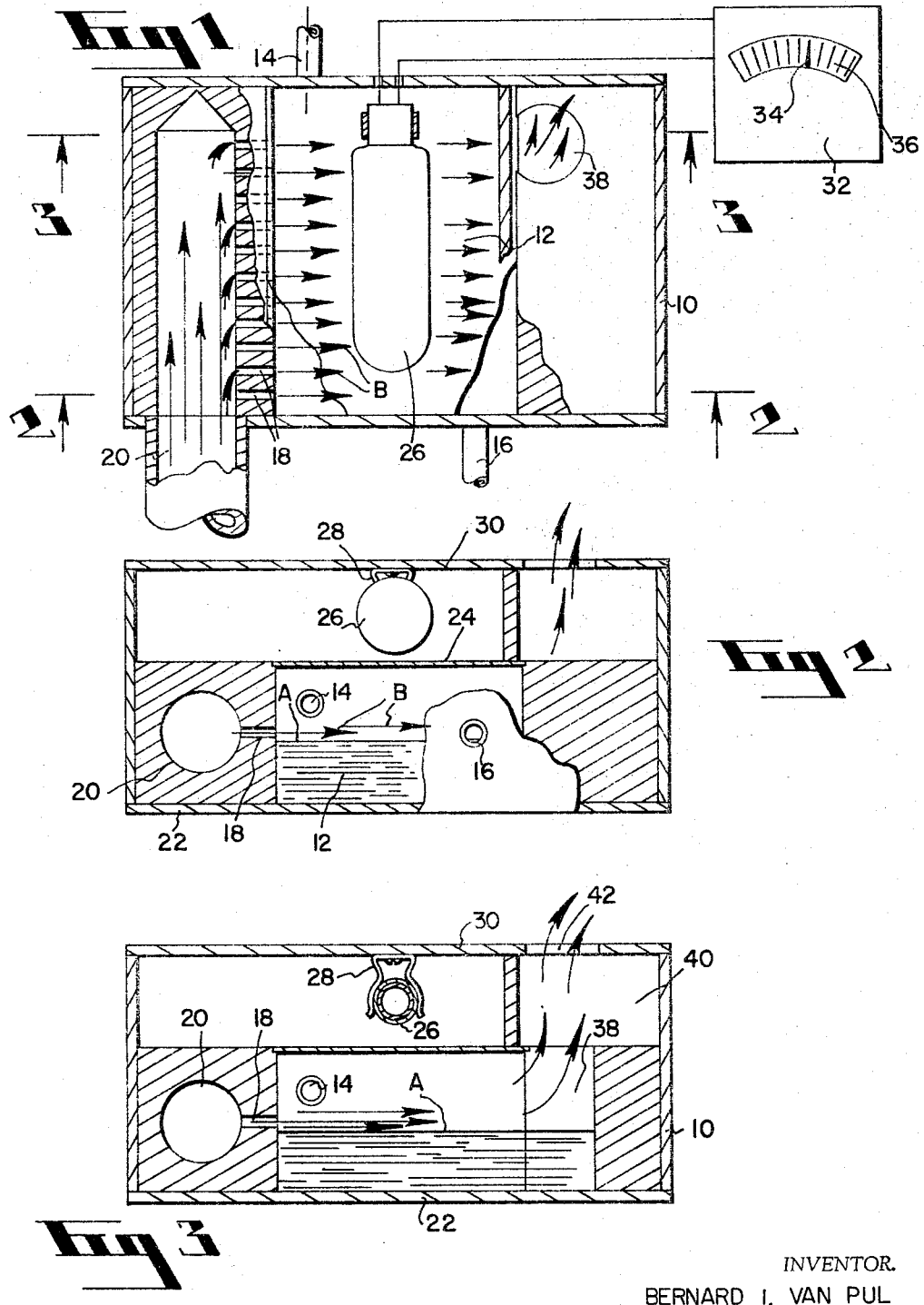

3,271,113
CHEMILUMINESCENCE DETECTION APPARATUS
Bernard I. van Pul, 6531 W. Devonshire Ave.,
Phoenix, Ariz.
Filed Apr. 12, 1963, Ser. No. 272,651
6 Claims. (Cl. 23—255)

This invention relates to a chemiluminescence detection apparatus and more particularly to a chemiluminescence detection apparatus which is capable of detecting and measuring the presence and concentration of ozone or other oxidant materials.

The measurement of oxidant gases, such as air with a trace of ozone content, has been required to determine the presence and concentration of such oxidant gases for use in various industries.

A prior art method of measuring ozone in air comprises the reaction of the ozonized air with such as oxidizable materials as potassium iodide whereby iodine is released so that subsequent measurement of the amount of iodine so released is accomplished by a conventional end point method to determine the ozone concentration.

This prior art procedure for determining the concentration of ozone is time consuming, somewhat indirect and subject to a substantial percentage of error.

Additionally, such prior art methods require a considerable investment in apparatus for recording such measurements.

Accordingly, it is an object of the present invention to provide a chemiluminescence detection apparatus which may be used in a very direct and simple manner to detect the presence and concentration of various oxidant materials in air or other gases.

Another object of the invention is to provide a very novel and simple apparatus for a chemiluminescence detection of ozone or other oxidant materials.

Another object of the invention is to provide a very simple apparatus for a chemiluminescence detection of an oxidant which involves a chamber in which luminescent material is maintained at a constant value by constant replacement of such during the flow of an oxidant gas thereover so that oxidation of the luminescent material is not permitted materially to reduce the value or luminescent capabilities of the luminescent material in the chamber.

Another object of the invention is to provide a chemiluminescence detection apparatus having a luminescent material chamber provided with a novel oxidant gas emitting manifold which disperses or directs a laminar flow of oxidant gas over the surface of a solution containing luminescent materials in the chamber which surface is maintained precisely at a fixed level with respect to the laminar flow of oxidant gas thereover.

Another object of the invention is to provide a chemiluminescence detection apparatus in which a novel luminescent material containing chamber is provided with a manifold which directs a laminar flow of an oxidant gas over the surface of luminescent material in said chamber which illuminates a photosensitive device coupled to a meter to provide a visual indication of the oxidant concentration in the gas flowing over the luminescent material in the chamber of the apparatus.

A further object of the invention is to provide a chemiluminescence detection apparatus which is very simple and reliable of construction, which may readily and easily be used to maintain luminescent material therein at a constant value and which also maintains a laminar flow of oxidant gas over the surface of the luminescent material in a very constant condition for accurately maintaining a relationship between the luminescent value of the material and the oxidation rate thereof, so that a photosensitive means may accurately transmit to a visual recording instrument the presence and concentration of oxidant in the oxidant gas passing through the chamber over the luminescent material therein.

Further objects and advantages of the invention may be apparent from the following specifications, appended claims, and accompanying drawings, in which:

FIG. 1 is a top or plan view of a chemiluminescence detection apparatus in accordance with the present invention, said illustration showing portions of the apparatus broken away and in section to amplify the disclosure;

FIG. 2 is a fragmentary sectional view taken from the line 2—2 of FIG. 1; and

FIG. 3 is a sectional view taken from the line 3—3 of FIG. 1.

As shown in FIG. 1 of the drawings the apparatus comprises a substantially rectangular enclosure structure 10. This enclosure structure may be of any suitable shape as desired. This enclosure structure 10 is provided with a central liquid holding chamber 12 adapted to hold "Luminol" containing solution or any other suitable luminescent material which will react with an oxidant to produce illumination.

Communicating directly with this chamber 12 is a luminescent material inlet 14. The inlet 14 comprises a conduit which is disposed to conduct a flow of luminescent material into the chamber 12.

An outlet tube or conduit 16 communicates with the interior of the chamber 12 and provides for the outflow of luminescent material from the chamber 12.

The conduit 16 is disposed at a level slightly below the conduit 14 and thus establishes a fixed level A of luminescent material in the chamber 12 due to the fact that the luminescent material will flow or drain outwardly through the tube 16 and thus maintain the level A substantially constant.

Oxidant gas inlet nozzles 18 are directed approximately horizontally and their axes are disposed slightly above the level A and the outlet level of the outlet conduit 16. These nozzles 18 communicate with a manifold 20 disposed to provide an inflow passage means communicating with all the nozzles 18 all as shown in FIGURES 1 and 2 of the drawings. It will seem that the nozzles 18 are disposed to provide a laminar flow of oxidant gas slightly above the upper level A of the luminescent material 12 and in a parallel plane relative thereto so that an efficient control of the flow of the oxidant gas over the upper surface A of the luminescent material may be maintained.

An elongated slot may be used as an equivalent to the plurality of nozzles 18, in order to accomplish the direction of laminar flow across the surface of the luminescent material.

It will be understood that the structure 10 at its lower surface 22 must be level so that the surface A of the luminescent material 12 may be disposed parallel with the axes of the nozzles 18.

The upper portion of the chamber 12 is covered by a transparent plate 24 which may be of glass or any other suitable material. This plate 24 is transparent to illumination emitted from the surface of the luminescent material in the chamber 12 when exposed to the oxidant gases issuing from the nozzles 18 in the direction indicated by arrows B in FIGURES 1 and 2 of the drawings. Illumination resulting from oxidation of the luminescent material by ozone or any other oxidant received by a photosensitive or photomultiplier cell 26 disposed directly above the transparent plate 24 and supported by brackets 28 fixed to the underside of a top 30 of the housing structure 10. The photomultiplier 26 is coupled to an indicating or recording instrument 32 having a movable pointer 34 which responds to energization of the photomultiplier 26 and this pointer 34 traverses a scale 36 to indicate the concentration of oxidant in the gas passing from the nozzles 18 and over the upper surface A of the luminescent material in the chamber 12.

It will be obvious that the instrument 32 may be used to energize a servo device which may regulate an ozone generator to supply ozone to an ozone chamber in such a manner that the ozone concentration is automatically kept constant.

As shown in FIGURES 1 and 3 the chamber 12 is provided with a gas escape extension portion 38 which projects into a compartment of the housing structure 10 this compartment 40 communicates with an exhaust opening 42 extending to atmosphere through the cover 30.

In operation luminescent material such as "Luminol," used in the chamber 12, reacts with oxidants such as ozone passing from the nozzles 18 and thus tends to deteriorate.

Accordingly, its light emitting capacity gradually reduces as it is further oxidized. The inlet tube 14 and the outlet tube 16 hereinbefore described provide for a small stabilizing flow of fresh luminescent material into the chamber 12 so that a constant condition thereof may be maintained with respect to the light emitting capability of the "Luminol."

The illumination passing directly to the photosensitive or photomultiplier cell 26 is then accurately recorded by the instrument 32 having the pointer 34 which may be visually read with the respect to a calibrated dial 36.

It will be appreciated that the apparatus of the present invention may be operated in a fully automatic manner simply by controlling a slight flow of luminescent material into and out of the chamber 12 in order to maintain the luminescent material at a fairly constant value. The instrument of the invention is therefore quite simple and economical to use and highly accurate as compared to prior art methods hereinbefore described. It will be appreciated by those skilled in the art that the simple facility of the outlet tube 16 maintaining a precise level with respect to the laminar flow of oxidant emitted by the nozzles 18 is a factor which contributes to the reliability and simplicity as well as the accurate operation of the apparatus of the invention.

It will be obvious to those skilled in the art that various modifications of the present invention may be resorted to in a manner limited only by a just interpretation of the following claims:

I claim:

1. In a chemiluminescence detection apparatus the combination of: a housing structure; a chamber for containing liquid luminescent material; first means for establishing an upper surface of said liquid luminescent material in said chamber; oxidant gas inlet means communicating with said chamber and disposed to conduct oxidant gas to said surface position of said luminescent material in said chamber; an outlet in said chamber to permit the escape of said gas therefrom and an illumination sensitive device disposed to receive light emitted from said luminescent material as it reacts with said oxidant gas.

2. In a chemiluminescence detection apparatus the combination of: a housing structure; a chamber for containing liquid luminescent material; first means for establishing an upper surface level of liquid luminescent material in said chamber; oxidant gas inlet means communicating with said chamber slightly above said upper surface level of luminescent material established by said first means; and an illumination sensitive device disposed to receive light emitted from said luminescent material as it reacts with said oxidant gas; an outlet in said chamber above said level for said gas to escape from said chamber, said first means comprising inlet and outlet means communicating with the interior of said chamber and disposed to conduct a flow of luminescent material into and out of said chamber, whereby said luminescent material is constantly renewed, said outlet being below said gas inlet means and disposed to drain luminescent material from said chamber at said level.

3. In a chemiluminescence detection apparatus the combination of: a housing structure; a chamber for containing liquid luminescent material; first means for establishing an upper surface level of luminescent material in said chamber; oxidant gas inlet means communicating with said chamber slightly above said upper surface level of luminescent material established by said first means; said oxidant gas inlet means comprising horizontally directed orifices adapted to cause said oxidant gas to flow horizontally across said upper surface and an illumination sensitive device disposed to receive light emitted from said luminescent material as it reacts with said oxidant gas; an outlet in said chamber above said level for said oxidant gas to escape from said chamber and a plate transparent to radiation from said luminescent material and disposed between said chamber and said illumination sensitive device.

4. In a chemiluminescence detection apparatus the combination of: a housing structure; a chamber for containing liquid luminescent material; first means for establishing an upper surface level of luminescent material in said chamber; oxidant gas inlet means communicating with said chamber slightly above a level of said liquid luminescent material established by said first means; and an illumination sensitive device disposed to receive light emitted from said luminescent material as it reacts with said oxidant gas; an outlet in said chamber disposed above said level to permit the escape of said gas from said chamber an illumination sensitive device comprising a photomultiplier and an indicator device coupled thereto said indicator device having a movable pointer; said illumination sensitive device disposed to receive radiation from said upper surface of said luminescent material; and a calibrated dial adjacent thereto.

5. In a chemiluminescence detection apparatus the combination of: a housing structure; a chamber for containing liquid luminescent material; first means for establishing an upper surface level of luminescent material in said chamber; horizontal row of oxidant gas inlet nozzles communicating with said chamber slightly above a level of luminescent material established by said first means, said nozzles having axes disposed to be approximately parallel to the surface of luminescent material at said level; and an illumination sensitive device disposed to receive light emitted from said luminescent material as it reacts with said oxidant gas; an outlet in said chamber disposed above said level to permit the escape of said gas from said chamber.

6. In a chemiluminescence detection apparatus the combination of: a housing structure; a chamber for containing liquid luminescent material; first means for establishing an upper surface level of luminescent material in said chamber and for constantly renewing said luminescent material in said chamber; oxidant gas inlet means communicating with said chamber slightly above said surface level of said liquid luminescent material established by said first means; said inlet means adapted to create a horizontal laminar flow of said gas over said upper surface level; an outlet in said chamber above said level to conduct said gas out of said chamber; a photomultiplier illumination sensitive device in said housing and disposed above said chamber to receive light emitted from said luminescent material as it reacts with said oxidant gas; and a plate transparent to radiation from said luminescent material, said plate disposed between said chamber and said illumination sensitive device.

References Cited by the Examiner

UNITED STATES PATENTS

| 2,604,108 | 7/1952 | Considine | 137—93 |
| 2,849,291 | 8/1958 | Allison et al. | 23—232 |

(Other references on following page)

OTHER REFERENCES

DeMent, Jack: Fluorochemistry, Chemical Publishing Company, Inc., New York (1945) pages 626–628.

Summer, W.: Photosensitors, Chapman & Hall Ltd., London (1957) pages 16, 389, 406.

Carroll, Grady C.: Industrial Process Measuring Instruments, McGraw-Hill Book Co., New York (March 30, 1962) pages 360–361.

MORRIS O. WOLK, *Primary Examiner.*

H. A. BIRENBAUM, *Assistant Examiner.*